United States Patent [19]
Lehman

[11] Patent Number: 5,385,132
[45] Date of Patent: Jan. 31, 1995

[54] ENGINE FLUID SYSTEM

[75] Inventor: Martin A. Lehman, Washington, Ill.

[73] Assignee: Caterpillar Inc., Peoria, Ill.

[21] Appl. No.: 165,873

[22] Filed: Dec. 14, 1993

[51] Int. Cl.⁶ ............................................. F02M 31/00
[52] U.S. Cl. ................................. 123/542; 123/556; 123/552
[58] Field of Search ............... 123/552, 542, 556, 545, 123/546, 547, 540

[56] References Cited

U.S. PATENT DOCUMENTS

| | | | |
|---|---|---|---|
| 1,131,016 | 3/1915 | Thornton et al. | 123/542 |
| 2,356,452 | 8/1944 | Fedden et al. | 123/542 |
| 2,525,374 | 10/1950 | Ruzicka | 123/542 |
| 3,030,943 | 4/1962 | Sarto | 123/556 |
| 3,397,684 | 8/1968 | Scherenberg | 123/179 |
| 3,441,011 | 4/1969 | Karl | 123/542 |
| 3,977,195 | 8/1976 | Treuil | 60/602 |
| 4,103,656 | 8/1978 | Reddekopp | 123/122 D |
| 4,207,848 | 6/1980 | Dinger et al. | 123/122 D |
| 4,662,342 | 5/1987 | Clement | 123/542 |
| 4,922,882 | 5/1990 | Topfer | 123/556 |
| 5,076,247 | 12/1991 | Schmidt et al. | 123/556 |
| 5,076,248 | 12/1991 | Schatz | 123/556 |

FOREIGN PATENT DOCUMENTS 52-52019 4/1977 Japan .

Primary Examiner—Tony M. Argenbright
Assistant Examiner—M. Macy
Attorney, Agent, or Firm—Frank L. Hart

[57] ABSTRACT

A fluid system of an internal combustion engine has controls and a separate radiator for maintaining the temperature of incoming engine combustion air at optimum conditions.

5 Claims, 1 Drawing Sheet

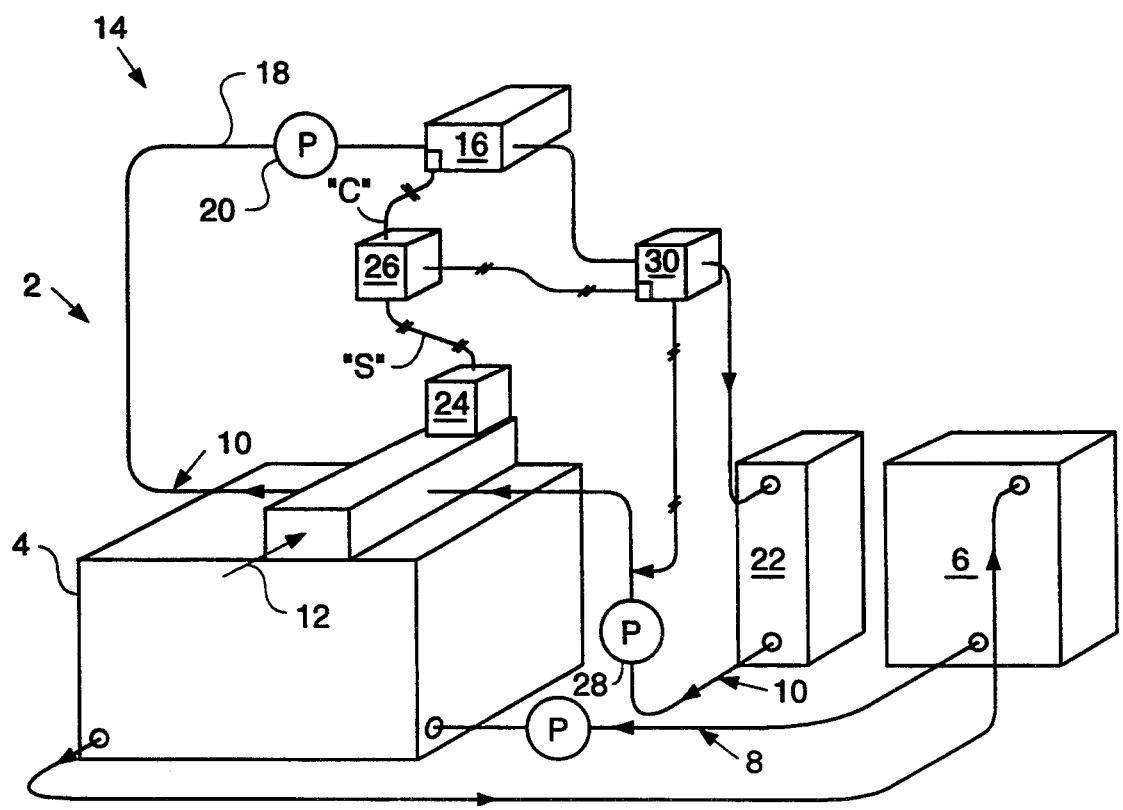

though the by-pass line 18 which is connected and in communication on one end to the second liquid coolant pathway 10 and on the other end to the heater 16. The by-pass system 14 also has a pump 20 for moving liquid coolant from the second liquid coolant pathway 10 through the by-pass system. The pump 20 is preferably connected in the by-pass line 18 at a location upstream of the heater 16.

ENGINE FLUID SYSTEM

TECHNICAL FIELD

The present invention relates to the fluid system of an internal combustion engine and more particularly to controlling the temperature of intake air of the engine.

BACKGROUND ART

It is known in the art that internal combustion engines generally start more readily in warm as opposed to cold weather. Efforts have been made to provide air warmer than ambient during starting of the engine during cold weather. One example effort in that direction is found in Japanese Patent No. 52-52019, "Supply Heating Device In A Supercharging Diesel Engine", which issued to Ishikawajima Harima Jukogyo K. K. et al. on Apr. 26, 1977.

Some of the problems still encountered in the operation of internal combustion engines resides in controlling the temperature of inlet air for combustion in order to optimize the exhaust gases, start the engine more quickly during cold weather and provide improved combustion during operation of the engine after warm up.

The present invention is directed to overcome one or more of the problems as set forth above.

DISCLOSURE OF THE INVENTION

In one aspect of the invention, a fluid system has a liquid coolant radiator, first and second liquid coolant pathways, and an inlet air pathway in communication with the engine combustion zone. The first liquid coolant pathway extends from the radiator to and in heat exchange relationship with the engine and back to the radiator. The second liquid coolant pathway is in heat exchange relationship with the inlet air pathway and has a liquid coolant by-pass system in communication with the second liquid coolant pathway at a location downstream of the inlet air pathway. The by-pass system has a heater for heating liquid passing through the by-pass from the second liquid pathway and a pump for moving liquid coolant from the second liquid coolant pathway and through the by-pass system. A second radiator, which is isolated from the first radiator, is connected to the second fluid pathway at a location upstream of the inlet air pathway. A controlling valve has an inlet end connected to the heater, a first discharge end connected to the second radiator, and a second discharge end connected to the second fluid pathway at a location between the inlet air pathway and the second radiator.

BRIEF DESCRIPTION OF THE DRAWINGS

The single FIGURE of the drawing is a diagrammatic view of the fluid system of this invention.

BEST MODE FOR CARRYING OUT THE INVENTION

Referring to the single figure of the drawing, the fluid system 2 of this invention is for an internal combustion engine 4 which, as is known in the art, has a combustion zone (not shown). The fluid system 2 has a liquid coolant radiator 6, first and second liquid coolant pathways 8,10 and an inlet air pathway 12 in communication with the engine combustion zone.

The first liquid coolant pathway 8 extends from the radiator 6 to and in heat exchange relationship with the engine 4 and back to the radiator 6. The second liquid coolant pathway 10 is in heat exchange relationship with the inlet air pathway 12. The by-pass system 14 has a heater 16 for heating liquid passing through the by-pass line 18 which is connected and in communication on one end to the second liquid coolant pathway 10 and on the other end to the heater 16. The by-pass system 14 also has a pump 20 for moving liquid coolant from the second liquid coolant pathway 10 through the by-pass system. The pump 20 is preferably connected in the by-pass line 18 at a location upstream of the heater 16.

The fluid system of this invention also includes a second radiator 22 which is isolated from the first radiator 6 and is connected to the second fluid pathway 10 at location upstream of the inlet air pathway 12. A controlling valve 30 has an inlet end connected to the heater 16, a first discharge end connected to the second radiator 22 and a second discharge end connected to second fluid pathway 10 at a location between the inlet air pathway 12 and the second radiator 22.

In this construction, substantially all fluid passing in heat exchange relationship with incoming combustion air is capable of having its temperature altered to optimum conditions by the system of this invention.

A first means 24 can be provided for sensing the temperature of air passing in heat exchange relationship with the second liquid coolant pathway 10 and delivering a signal "S" in response to this sensed temperature. A second means 26 can be provided for receiving the signal "S" and controlling the output of the heater 16 in response to said received signal "S".

In the preferred embodiment of this invention, the second means 26 is adapted to compare the received signal "S" to a set point signal and deliver a controlling Signal "C" to the heater 16 and the controlling valve 30 in response to said signal "S" being of respective preselected magnitudes different than set point signals of said heater 16 and controlling valve 30. It is also preferred that the second radiator 22 be of a size sufficient to maintain the liquid coolant entering the second liquid coolant pathway 10 at a temperature in the range of about ambient temperature to less than the temperature of the liquid coolant entering the first liquid coolant pathway 8 during operation of the engine 4 with the by-pass heater 16 in the off condition.

The temperature sensing element, heater, and valve controls are well known in the art and can be selected and the radiator sized, as set forth above, by one skilled in the art without undue experimentation.

INDUSTRIAL APPLICABILITY

By the construction and controls of this invention, the heater can be energized and the incoming combustion an warmed for cold starts of the engine. The air temperature can continue to be monitored and amount of heat added by the heater reduced as the air temperature increases. As the air temperature reaches an optimum magnitude, the heater can be turned off and the second liquid coolant pathway controlled to regulate the air temperature. Such controls would be connected to the signal "S" with the by-pass liquid discharge controlled by a controlling valve 30 comparing the Signal "S" to a set point signal. The sizing of the second radiator 22 in conjunction with its isolation from the engine heat of combustion permits the system of this invention to control incoming engine air at optimum engine operating conditions by selectively and automatically heating and/or cooling the incoming air.

Other aspects, objects and advantages of this invention can be obtained from a study of the drawing, the disclosure and the appended claims.

What is claimed is:

1. In a fluid system for an engine having a combustion zone, said fluid system having a liquid coolant radiator, first and second liquid coolant pathways, and an inlet air pathway in communication with the engine combustion zone, said first liquid coolant pathway extending from the radiator to and in heat exchange relationship with the engine and back to the radiator, said second liquid coolant pathway being in heat exchange relationship with the inlet air pathway, and a liquid coolant by-pass system in communication with the second liquid coolant pathway at a location downstream of the inlet air pathway, said by-pass system having a heater for heating liquid passing through the by-pass from the second liquid coolant pathway and a pump for moving liquid coolant from the second liquid coolant pathway and through the by-pass system, the improvement comprising:

a second radiator isolated from the first radiator and being connected to the second fluid pathway at a location upstream of the inlet air pathway; and a controlling valve having an inlet end connected to the heater, a first outlet end connected to the second radiator and a second outlet connected to the second fluid pathway at a location between the inlet air pathway and the second radiator.

2. A fluid system, as set forth in claim 1, wherein the by-pass system includes first means for sensing the temperature of air passing in heat exchange relationship with the second liquid coolant pathway and delivering a signal (S) in response thereto; and second means for receiving said signal (S) and controlling the output of the heater in response to said received signal.

3. A fluid system, as set forth in claim 2, wherein the second means is adapted to compare the received signal (S) to a set point signal and deliver a controlling signal (C) to the heater in response to said signal (S) being of a preselected magnitude different than said set point signal.

4. A fluid system, as set forth in claim 2, including third means for receiving the signal (C) and controlling delivery of fluid discharging from the heater to one of the second radiator and the second fluid pathway in response to said received signal (C).

5. A fluid system, as set forth in claim 1, wherein the second radiator is of a size sufficient to maintain the liquid coolant entering the second liquid coolant pathway at a temperature in the range of about ambient temperature to less than the temperature of the liquid coolant entering the first liquid coolant pathway during operation of the engine when the by-pass heater is off.

* * * * *